US009204339B2

(12) United States Patent
Pekonen et al.

(10) Patent No.: US 9,204,339 B2
(45) Date of Patent: Dec. 1, 2015

(54) CONTROL MECHANISM FOR AUTONOMOUS MOBILITY OF TERMINAL DEVICE

(71) Applicant: Nokia Siemens Networks Oy, Espoo (FI)

(72) Inventors: Johanna Katariina Pekonen, Espoo (FI); Antti Anton Toskala, Espoo (FI); Klaus Ingemann Pedersen, Aalborg (DK)

(73) Assignee: Nokia Solutions and Networks Oy, Espoo (FI)

( * ) Notice: Subject to any disclaimer, the term of this patent is extended or adjusted under 35 U.S.C. 154(b) by 157 days.

(21) Appl. No.: 13/960,976

(22) Filed: Aug. 7, 2013

(65) Prior Publication Data

US 2014/0045494 A1 Feb. 13, 2014

(30) Foreign Application Priority Data

Aug. 7, 2012 (WO) ................. PCT/EP2012/065436

(51) Int. Cl.
*H04W 4/00* (2009.01)
*H04W 36/00* (2009.01)
*H04W 36/04* (2009.01)
*H04W 36/36* (2009.01)

(52) U.S. Cl.
CPC ...... *H04W 36/0005* (2013.01); *H04W 36/0061* (2013.01); *H04W 36/04* (2013.01); *H04W 36/36* (2013.01)

(58) Field of Classification Search
CPC ............................ H04W 8/005; H04W 48/20
USPC ......... 455/436, 423, 438, 446, 437, 444, 427, 455/434, 442; 370/331, 312
See application file for complete search history.

(56) References Cited

U.S. PATENT DOCUMENTS

| 5,574,968 | A  | * | 11/1996 | Olds et al. ..................... 455/428 |
| 7,110,766 | B1 | * | 9/2006  | Tayloe et al. ................. 455/438 |
| 2010/0075677 | A1 |   | 3/2010  | Wang et al. ................... 455/436 |
| 2011/0261785 | A1 | * | 10/2011 | Kwon et al. .................. 370/331 |
| 2011/0281581 | A1 |   | 11/2011 | Brandt et al. ................. 455/427 |

OTHER PUBLICATIONS

3GPP TS 36.331 V10.5.0 (Mar. 2012) 3rd Generation Partnership Project; Technical Specification Group Radio Access Network; Evolved Universal Terestrial Radio Access (E-UTRA); Radio Resource Control (RRC); Protocol specificaion (Release 10) (302 pages).

* cited by examiner

*Primary Examiner* — Kiet Doan
(74) *Attorney, Agent, or Firm* — Harrington & Smith

(57) ABSTRACT

There is provided a mechanism for controlling an autonomous mobility procedure of a user equipment. A list of candidate communication cells usable as target cells for the autonomous mobility procedure conducted by the UE is transmitted by the network to the UE. Furthermore, when the list is sent to the communication element, preparation information is sent to the candidate communication cells contained in the list sent to the user equipment for preparing the candidate communication cells for a potential autonomous mobility procedure conducted by the user equipment. When a cell is detected, the user equipment uses the list to determine whether the detected cell is a candidate cell for the autonomous mobility procedure. When the cell receives an access request, it uses the preparation information for determining that the requesting UE is conducting an autonomous mobility procedure, and obtains configuration date for immediately providing service to the user equipment.

20 Claims, 8 Drawing Sheets

CONTROL MECHANISM FOR AUTONOMOUS MOBILITY OF TERMINAL DEVICE

BACKGROUND OF THE INVENTION

Field of the Invention

The present invention relates to a mechanism for controlling an autonomous mobility procedure of a terminal device or user equipment. Specifically, the present invention is related to an apparatus, a method and a computer program product which allow that a terminal device or user equipment conducts an autonomous mobility procedure, for example in a heterogeneous network.

The following meanings for the abbreviations used in this specification apply:
BS: base station
CA: carrier aggregation
eNB: evolved node B
ID: identification
LTE: Long Term Evolution
LTE-A: LTE Advanced
MeNB: macro eNB
PCell: primary cell
PCI: physical cell ID
PeNB: pica eNB
QoS: quality of service
RACH: random access channel
RRC: radio resource control
RF: radio frequency
SCell: secondary cell
UE: user equipment In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) and fourth generation (4G) communication networks like the Universal Mobile Telecommunications System (UMTS), enhanced communication networks based e.g. on LTE or LTE-A, cellular 2nd generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

Generally, for properly establishing and handling a communication connection between terminal devices such as a user equipment (UE) and another communication network element or user equipment, a database, a server, etc., one or more intermediate network elements such as communication network control elements, such as base transceiver stations, control nodes, support nodes or service nodes are involved which may belong to different communication network.

In recently developed communication networks, such as 3GPP LTE or LTE-A based networks according to Release 10, carrier aggregation (CA) is introduced. The motivation to use CA is, for example, to increase transmission bandwidth, to use more efficiently a fragmented spectrum, and to support heterogeneous network configurations. In other words, carrier aggregation is employed for improving the performance of communication networks. For this purpose, CA extends the maximum bandwidth in the UL or DL directions by aggregating multiple carriers within a frequency band (intra-band CA) or across frequency bands (inter-band CA).

A further item of new communication network system is the implementation of heterogeneous networks consisting of e.g. a "normal" communication cell (referred to as macro cell) and plural small cells which allows a better coverage and possibly outsourcing options from a communication in the macro cell to a small cell (which may be connected to the network e.g. by a backhaul network offering higher capacity), or the like. In the following, it is assumed that a macro cell is used as a primary cell (PCell) for a UE communication, and the small cells are used as secondary cells (SCells) for the UE communication.

As one possible scenario considered for communication networks, such as a 3GPP LTE-A based network according to Release 10, for example, in a CA usage case, the aggregated carriers are formed between the macro cell and a small cell (such as a micro/pico cell) (or optionally where the connection between the macro cell and the small cell is not based on dedicated fiber to separate from a remote RF head case). This is also referred to as a heterogeneous network scenario with inter-site carrier aggregation. In such a scenario, the frequencies of the respective carriers may be significantly different. For example, the small cells are densely deployed on a high frequency carrier, such as e.g. 3.5 GHz, while the macro cell (or layer) is deployed at lower frequencies (e.g. at 700 MHz to 2.6 GHz carrier).

However, with regard to mobility of a terminal device or UE, i.e. when a terminal device intends to establish a connection with such a Scell, the following is to be considered. In case mobility procedures such a handover or access of a UE to a Scell using carriers at higher frequencies are to be executed, the following aspects arise.

The small cells may have only a limited (i.e. small) coverage area so that they are "visible" (i.e. in range) for moving users for a rather short time-instant; thus, a conventional handover procedure implemented in current mobility procedures which includes for example an exchange of measurement reports and handover commands between the network (Pcell) and the UE requires a lot of time which is to be subtracted from the rather short period of time where the moving UE is in range of the small cell. Therefore, the usability of such Scells is limited. Furthermore, it is to be noted that in existing mobility solutions a lot of signaling between the eNB and the UE as well as between the eNB of the Pcell and the eNB of a Scell may take place being triggered when UEs are moving through areas with a high density of small cells. This does not only cause delay, as described above, but also increases the signaling load producing potentially a high overhead.

SUMMARY OF THE INVENTION

It is an object of the invention to overcome the above described problems and to provide an enhanced mobility procedure for UEs. Specifically, the present invention provides an apparatus, a method and a computer program product which provide an improved mobility procedure for UEs allowing to conduct an autonomous handover or access procedure (i.e. an autonomous mobility procedure) by the UE, for example in a case where a UE is communicating in a heterogeneous network and an inter-site carrier aggregation is used.

These objects are achieved by the measures defined in the attached claims.

According to an example of an embodiment of the proposed solution, there is provided, for example, an apparatus comprising at least one processor, at least one interface to at least one other network element, and at least one memory for storing instructions to be executed by the processor, wherein the at least one memory and the instructions are configured to, with the at least one processor, cause the apparatus at least to perform: a candidate list creation function configured to create a list of candidate communication cells usable as target cells for an autonomous mobility procedure conducted by a communication element, a list sending function configured to cause sending the list to a communication element, and a preparation information function configured to cause transmitting, when the list is sent to the communication element, preparation information to the candidate communication cells contained in the list sent to the communication element, the preparation information comprising information for preparing the candidate communication cells for a potential autonomous mobility procedure conducted by the communication element.

Furthermore, according to an example of an embodiment of the proposed solution, there is provided, for example, a method comprising creating a list of candidate communication cells usable as target cells for an autonomous mobility procedure conducted by a communication element, causing sending of the list to a communication element, and causing transmitting, when the list is sent to the communication element, of preparation information to the candidate communication cells contained in the list sent to the communication element, the preparation information comprising information for preparing the candidate communication cells for a potential autonomous mobility procedure conducted by the communication element.

According to further refinements, these examples may comprise one or more of the following features:
- the list of candidate cells may comprise at least one of an information element indicating a cell identification of each candidate communication cell, a carrier identification element indicating a component carrier to which the autonomous mobility procedure is to be directed, and timer information indicating a time period in which the candidate communication cell is allowed to participate in the autonomous mobility procedure;
- the list may be sent to the communication element as a measurement configuration information;
- the preparation information may comprise at least one of an information element indicating an identification of the communication element to which the list is sent, an information element indicating a source for obtaining configuration data necessary for providing immediate service to the communication element when the autonomous mobility procedure is executed, configuration data necessary for providing immediate service to the communication element when the autonomous mobility procedure is executed, and tinier information indicating a time period in which the candidate communication cell is allowed to participate in the autonomous mobility procedure;
- the preparation information may be transmitted via an interface between communication network control elements;
- a request for obtaining the configuration data necessary for providing the immediate service to the communication element when the autonomous mobility procedure is executed may be received from a candidate communication cell, and corresponding configuration data related to the communication element may be transmitted to the requesting candidate communication cell;
- a switch-over of the communication element from a first of the candidate communication cells to a second of the candidate communication cells on the same carrier may be detected, and the first of the candidate communication cells may be instructed to release the connection to the communication element via the carrier;
- any of the candidate communication cells may be informed that it is released as a target cell for the autonomous mobility procedure conducted by the communication element;
- the above procedures may be implemented in a communication network control element controlling a primary serving cell with which the communication element communicates, wherein the communication element may be a terminal device or user equipment, and wherein the candidate communication cells may be secondary cells located in an area of the primary serving cell; then, the primary serving cell may be configured to communicate with the communication element via at least one first carrier, and each of the secondary cells may be configured to communicate with the communication element via at least one second carrier, wherein a carrier aggregation of the at least one first carrier and the at least one second carrier may be used for a communication of the communication element.

In addition, according to a further example of an embodiment of the proposed solution, there is provided, for example, an apparatus comprising at least one processor, at least one interface to at least one other network element, and at least one memory for storing instructions to be executed by the processor, wherein the at least one memory and the instructions are configured to, with the at least one processor, cause the apparatus at least to perform: a preparation information processing function configured to receive and process preparation information, the preparation information comprising information for preparing a cell as a target cell for a potential autonomous mobility procedure conducted by a communication element, a communication access request processing function configured to receive and process a request from a communication element to establish a connection, a determination function configured to determine whether the preparation information is related to the requesting communication element, a configuration data obtaining function configured to obtain, in case it is determined that the preparation information is related to the requesting communication element, on the basis of the preparation information, configuration data necessary for providing immediate service to the communication element when the autonomous mobility procedure is executed, and a connection establishing function configured to establish a connection to the requesting communication element by using the configuration data obtained.

Furthermore, according to the further example of an embodiment of the proposed solution, there is provided, for example, a method comprising receiving and processing preparation information, the preparation information comprising information for preparing a cell as a target cell for a potential autonomous mobility procedure conducted by a communication element, receiving and processing a request from a communication element to establish a connection, determining whether the preparation information is related to the requesting communication element, obtaining, in case it is determined that the preparation information is related to the requesting communication element, on the basis of the preparation information, configuration data necessary for providing immediate service to the communication element when the autonomous mobility procedure is executed, and establishing a connection to the requesting communication element by using the configuration data obtained.

According to further refinements, these examples may comprise one or more of the following features:

- the preparation information may comprise at least one of an information element indicating an identification of the communication element which potentially conducts the autonomous mobility procedure, an information element indicating a source for obtaining the configuration data necessary for providing immediate service to the communication element when the autonomous mobility procedure is executed, configuration data necessary for providing immediate service to the communication element when the autonomous mobility procedure is executed, and timer information indicating a time period in it is allowed to participate in the autonomous mobility procedure;
- the preparation information may be received via an interface between communication network control elements;
- the configuration data may be obtained by causing sending of a request for obtaining the configuration data related to the requesting communication element to the source indicated in the preparation data, and receiving corresponding configuration data related to the requesting communication element;
- an instruction may be received and processed to release the connection to the communication element via a carrier when a switch-over of the communication element to another communication cell on the same carrier is completed;
- an information indicating a release as a target cell for the autonomous mobility procedure conducted by the communication element may be received and processed;
- the above procedures may be implemented in a communication network control element controlling a secondary cell with which the communication element communicates, wherein the communication element may be a terminal device or user equipment, and wherein the preparation information may be received from a communication network control element controlling a primary serving cell with which the communication element communicates, wherein the secondary cell may be located in an area of the primary serving cell; then, the primary serving cell may be configured to communicate with the communication element via at least one first carrier, and the secondary cell may be configured to communicate with the communication element via at least one second carrier, wherein a carrier aggregation of the at least one first carrier and the at least one second carrier may be used for a communication of the communication element.

In addition, according to a further example of an embodiment of the proposed solution, there is provided, for example, an apparatus comprising at least one processor, at least one interface to at least one other network element, and at least one memory for storing instructions to be executed by the processor, wherein the at least one memory and the instructions are configured to, with the at least one processor, cause the apparatus at least to perform: a candidate list processing function configured to receive and process a list of candidate communication cells usable as target cells for an autonomous mobility procedure conducted by a communication element, and a cell detection function configured to detect communication cells for establishing a communication connection, wherein the candidate list processing function is further configured to determine whether a communication cell detected is comprised in the list of candidate communication cells, and in case the detected communication cell is comprised in the list, to allow to conduct the autonomous mobility procedure to request immediate access to the detected cell as a target cell.

Furthermore, according to the further example of an embodiment of the proposed solution, there is provided, for example, a method comprising receiving and processing a list of candidate communication cells usable as target cells for an autonomous mobility procedure conducted by a communication element, detecting communication cells for establishing a communication connection, determining whether a communication cell detected is comprised in the list of candidate communication cells, and in case the detected communication cell is comprised in the list, allowing to conduct the autonomous mobility procedure to request immediate access to the detected cell as a target cell.

According to further refinements, these examples may comprise one or more of the following features:

- the list of candidate cells may comprise at least one of an information element indicating a cell identification of each candidate communication cell, a carrier identification element indicating a component carrier to which the autonomous mobility procedure is to be directed, and timer information indicating a time period in which the candidate communication cell is allowed to participate in the autonomous mobility procedure;
- the list may be received as a measurement configuration information;
- it may be decided whether the autonomous mobility procedure is to be conducted to the target cell, the decision being based on a connection quality evaluation related to an existing connection to another cell and a connection to be established to the target cell;
- when the autonomous mobility procedure to get immediate access to the target cell is to be conducted, a connection establishment may be requested via a random access channel;
- the procedures may be implemented in a communication element comprising a user equipment or terminal device, wherein the list may be received from a communication network control element controlling a primary serving cell with which the communication element communicates, and wherein the candidate communication cells may be secondary cells located in an area of the primary serving cell; then, the primary serving cell may be configured to communicate with the communication element via at least one first carrier, and each of the secondary cells may be configured to communicate with the communication element via at least one second carrier, wherein a carrier aggregation of the at least one first carrier and the at least one second carrier may be used for a communication of the communication element.

In addition, according to examples of the proposed solution, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

By virtue of the proposed solutions, it is possible to provide an enhanced mobility procedure for UEs allowing to conduct an autonomous handover or access procedure (i.e. an autonomous mobility procedure) by the UE, in particular when the UE is communicating in a heterogeneous network and an inter-site carrier aggregation is used. For example, by means of the present invention, it is possible that the mobility of the UEs is enhanced in a configuration where the small cells are densely deployed (also referred to as a pico cluster) and use a carrier on a high frequency (such as e.g. 3.5 GHz) while the macro-layer is deployed at lower frequencies (e.g. at 700 MHz to 2.6 GHz carrier). The mobility within the pico cluster is improved since the mobility events (i.e. the events where the UE can establish the connection to the "new" SCell become faster). One reason for this is that the mobility is not dependent on the RRC connection quality of an "old" (i.e. already connected) Scell. Furthermore, since the RRC connection quality of an "old" (i.e. already connected) Scell may decrease rapidly (due to the high frequency), a possible interruption can be avoided since a "new" connection with another Scell can be established already beforehand or at least very fast. Thus, a service interruption would be minimal as the UE accessing another pico cell (Scell) gets the packets (and acknowledgement to the RACH operation) quickly, which is due to preconfigured parameters comprised in preparation information stored beforehand in the pico cells (i.e. where to fetch the data, possible security parameters etc.). Furthermore, by using the autonomous mobility solution according to the invention, it is possible to reduce not only delays but also signaling overhead from mobility management. Moreover, according to one aspect, in case preparation data do not comprise (at least partly) the configuration data but indicate the source for retrieving the configuration data (e.g. in the macro cell eNB), candidate cells (Scells) do not require memory space for storing the configuration data of possibly plural UEs, i.e. they need to store less information about the UEs as in case the UE context would be delivered to the candidate cells already as part of the preparation procedure.

The above and still further objects, features and advantages of the invention will become more apparent upon referring to the description and the accompanying drawings.

DESCRIPTION OF PREFERRED EMBODIMENTS

Figure 1:
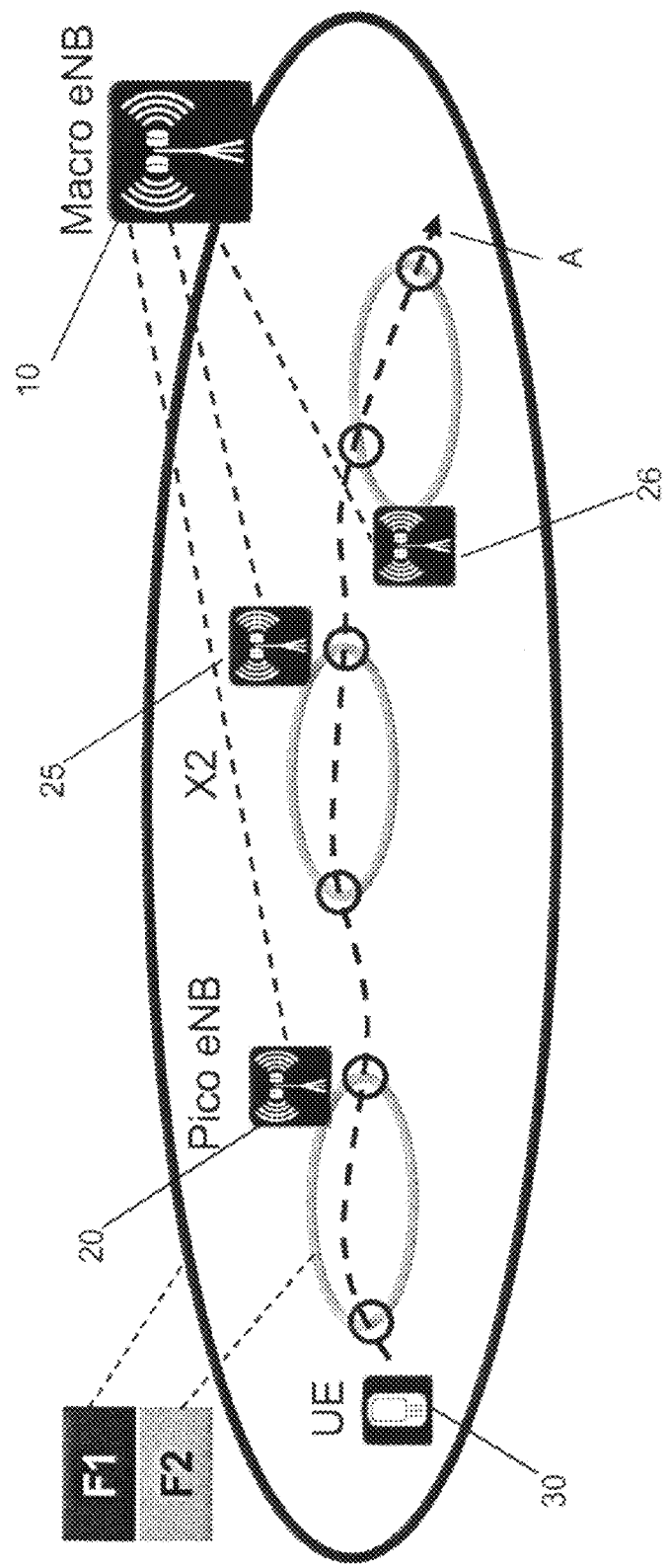
FIG. 1 shows a diagram illustrating a communication network configuration where examples of embodiments of the invention are implemented.

In the following, examples and embodiments of the present invention are described with reference to the drawings. For illustrating the present invention, the examples and embodiments will be described in connection with a cellular communication network based on a 3GPP based communication system, for example an LTE-A based system. However, it is to be noted that the present invention is not limited to an application using such types of communication system, but is also applicable in other types of communication systems and the like.

A basic system architecture of a communication network where examples of embodiments of the invention are applicable may comprise a commonly known architecture of one or more communication systems comprising a wired or wireless access network subsystem and a core network. Such an architecture may comprise one or more access network control elements, radio access network elements, access service network gateways or base transceiver stations, such as a base station or eNB, which control a coverage area also referred to as a cell and with which one or more communication elements or terminal devices such as a UE or another device having a similar function, such as a modem chipset, a chip, a module etc., which can also be part of a UE or attached as a separate element to a UE, or the like, are capable to communicate via one or more channels for transmitting several types of data. Furthermore, core network elements such as gateway network elements, policy and charging control network elements, mobility management entities and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a communication element or terminal device like a UE and a communication network control element like a base transceiver station or eNB, besides those described in detail herein below.

Furthermore, the described network elements, such as terminal devices like UEs, communication network control elements of a macro cell, like an MeNB, communication network control elements of a pico (micro, femto etc.) cell, like an PeNB and the like, as well as corresponding functions as described herein may be implemented by software, e.g. by a computer program product for a computer, and/or by hardware. In any case, for executing their respective functions, correspondingly used devices, nodes or network elements may comprise several means and components (not shown) which are required for control, processing and communication/signaling functionality. Such means may comprise, for example, one or more processor units including one or more processing portions for executing instructions, programs and for processing data, memory means for storing instructions, programs and data, for serving as a work area of the processor or processing portion and the like (e.g. ROM, RAM, EEPROM, and the like), input means for inputting data and instructions by software (e.g. floppy disc, CD-ROM, EEPROM, and the like), user interface means for providing monitor and manipulation possibilities to a user (e.g. a screen, a keyboard and the like), interface means for establishing links and/or connections under the control of the processor unit or portion (e.g. wired and wireless interface means, an antenna, etc.) and the like. It is to be noted that in the present specification processing portions should not be only considered to represent physical portions of one or more processors, but may also be considered as a logical division of the referred processing tasks performed by one or more processors.

With regard to FIG. 1, a diagram illustrating a general configuration of a communication network is shown where examples of embodiments of the invention are implemented. It is to be noted that the configuration shown in FIG. 1 shows only those devices, network elements and parts which are useful for understanding principles underlying the examples of embodiments of the invention. As also known by those skilled in the art there may be several other network elements or devices involved in a communication between the communication device (UE) and the network which are omitted here for the sake of simplicity.

In FIG. 1, a communication network configuration is illustrated in which examples of embodiments of the invention are implementable. The network according to FIG. 1 is for example based on 3GPP specifications and forms a heterogeneous network including a primary serving cell (Pcell) and one or more secondary cells (Scells). It is to be noted that the general functions of the elements described in connection with FIG. 1 as well as of reference points/interfaces therebetween are known to those skilled in the art so that a detailed description thereof is omitted here for the sake of simplicity.

As shown in FIG. 1, in the exemplary communication network, a Pcell is formed by a macro cell controller by a communication network control element such as an eNB (Macro cell eNB or MeNB) 10. The eNB 10 provides, for example, a connection to the core network of the communication network. In the example shown in FIG. 1, it is assumed that the Pcell uses a carrier on a frequency F1.

In the macro cell, one or more small cells or secondary cells (Scells) are located. Each small cell is controlled by an own communication network control element, such as eNBs 20, 25, 26 (referred to as pico eNBs or PeNBs). In the example shown in FIG. 1, it is assumed that the Scells use a carrier on a frequency F2 being different to F1, as discussed above (i.e. a high frequency compared to frequency F1). The PeNBs 20, 25, 26 and the MeNB 10 are connected with each other, for example by a backhaul network, which is indicated by interfaces X2 in FIG. 1.

Furthermore, a communication element or terminal device UE 30 is assumed to be located in the communication network. The UE 30 is configured to communicate with the communication network via at least one eNB by using for example an air interface. It is assumed that for the communication of the UE 30, CA is used, in particular inter-site carrier aggregation using carriers F1 and F2.

When the UE 30 moves in the coverage areas of the respective cells, for example as indicated by arrow A in FIG. 1, the UE is within the coverage area controlled by the MeNB 10 while entering and leaving the coverage areas controlled by the PeNBs 20, 25 and 26 (points of entering and leaving the small cells are indicated by corresponding circles at the respective coverage edges).

As described above, for mobility considerations of the UE 30 in the network, where the UE 30 is connected with a macro cell via a carrier F1 and, when using carrier aggregation, connectable with small cells via carrier F2 at higher frequency than F1, the following applies. As the small cells of PeNBs 20, 25 and 26 have a limited (i.e. small) coverage area, they are visible for a moving users of UE 30 for a rather short time. Hence, according to examples of embodiments of the invention, the time period in which the UE 30 can communicate with the small cell is tried to be not limited, e.g. by mobility procedures where the UE 30 sends measurement reports, followed by providing handover commands from the network. Furthermore, also signaling load in the network producing a high overhead are avoided, which is caused for example by eNB-to-UE signaling (and vice versa) as well as inter-eNB signaling, in particular in a network having a high density of small cells causing frequent switches to another small cell.

In the following, examples of embodiments of the invention providing an autonomous mobility procedure, for example for handover or access of a UE to a cell, such as a small cell as depicted in FIG. 1, is described with reference to the signaling diagram illustrated in FIG. 2.

Figure 2:
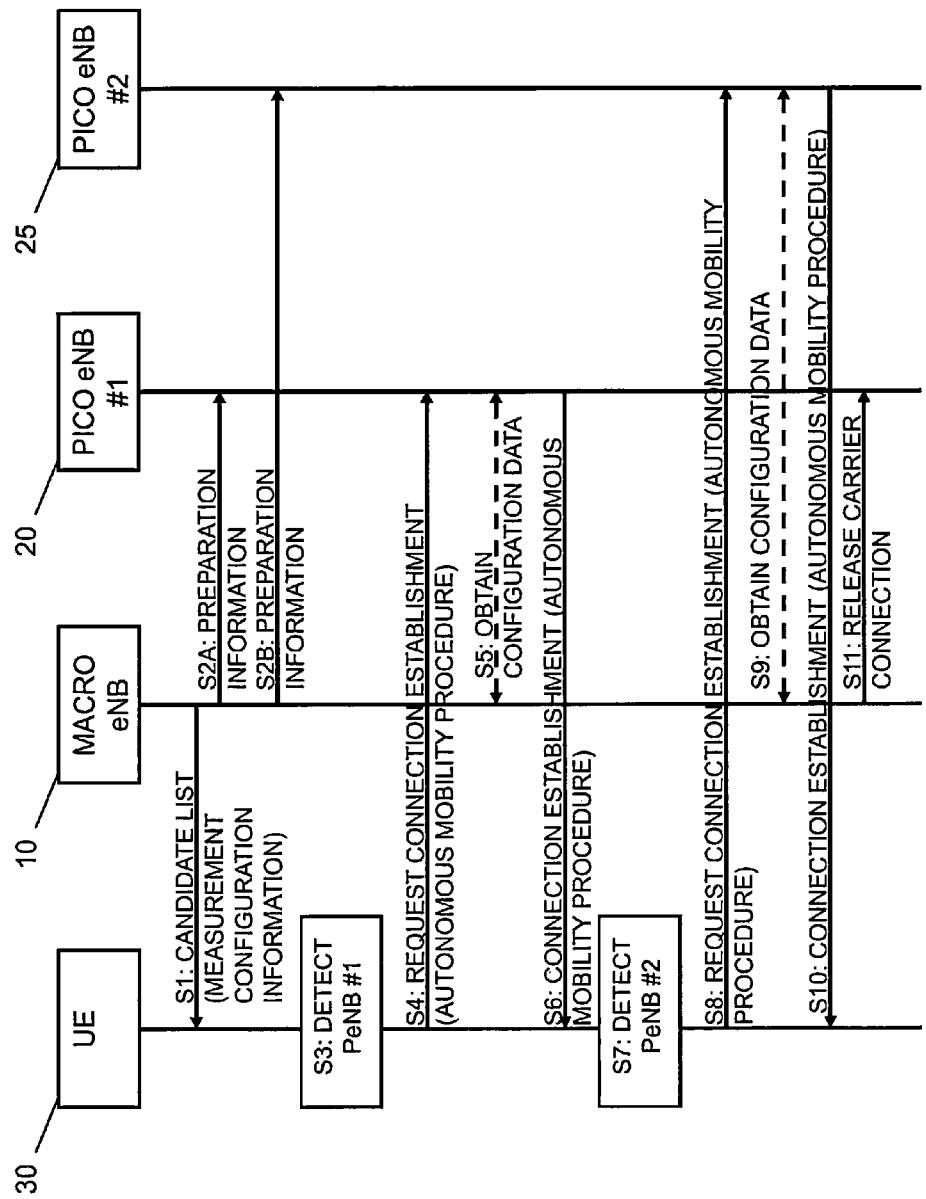
FIG. 2 shows a signaling diagram illustrating a autonomous mobility procedure dependency according to examples of embodiments of the invention.

FIG. 2 shows the signaling exchanged between the UE 30 and the MeNB 10 as well as PeNBs 20 and 25 (PeNB 26 is excluded in the considerations of FIG. 2, but the same processing is also applicable with a third (or even more) PeNB).

In step S1, the network signals a list of candidate communication cells to which a UE is allowed to make an autonomous handover/access request on a certain carrier (autonomous mobility procedure). The list is sent to a connected terminal device or UE (e.g. UE 30) located in its coverage area and connected to ft. For example, the communication network control element of the macro cell, i.e. MeNB 10, sends a corresponding list of candidate cells to the UE 30 as a new measurement configuration information. The candidate cells are identified in the list in a manner which can be understood and detected by the UE 30, for example, by means of their PCIs.

According to examples of embodiments, the list of candidate cells is created by the network, e.g. the MeNB 10, for example, when the UE 30 establishes an initial connection to the macro cell, or when the UE 30 sends a corresponding request. In addition, according to examples of embodiments, the candidate cells selected by the MeNB 10 to be included in the list comprise all small cells located in the area of the macro cell and being provided with a connection to the MeNB (e.g. in form of an X2 interface), or a selected part of the small cells. As selection criteria, different properties of the cells, an estimated movement path of the UE 30, load conditions of the respective small cells (if known), etc. can be specified and used.

When the list of candidate cells is sent to the UE 30, the MenNB 10 sends in steps S2a and S2B to the communication network control elements of the cells indicated in the list of candidate cells, e.g. to PeNBs 20 and 25, preparation information in order to ensure that the cells on the candidate list are all prepared for a potential UE autonomous handover/access procedure. For example, according to examples of embodiments of the invention, the cells (i.e. their PeNBs 20 and 25) are provided with necessary information so that an immediate service for a UE conducting the autonomous mobility procedure on the basis of list can be started by the respective cell, e.g. after UE 30 requests access. That means, the cells are provided with information for identifying a corresponding UE, such as by the UE ID of the potential terminal devices that may request access. Furthermore, information for obtaining configuration information for a connection with the potential UE are provided, i.e. data related to a transmission/ reception to/from the UE, QoS information, etc. For example, the preparation information comprise at least a part of the corresponding configuration information for each UE in question, and/or the preparation information comprise an indication of a source (such as the MeNB 10) from which the configuration information can be retrieved, and the like.

In step S3, the UE 30 detects that it is in the coverage area of a (further) cell, such as the cell of PeNB 20. Then, the UE 30 compares the received ID of the detected cell with that indicated in the list received in step S1. Whenever the UE 30 detects the detected cell is included in the list, it is allowed to directly access the cell with the autonomous mobility procedure, for example by signaling via a specific access channel like the RACH.

In step S3, according to examples of embodiments of the invention, the UE 30 decides also whether a connection to the newly detected cell is to be conducted. This decision is based, for example, on the current communication load, an instruction from a user or the network to establish a (further) connection, if possible, in order to outsource communication parts, a current quality of existing connections to the MeNB or another cell, etc.

It is to be noted that in case the UE 30 detects a cell in step S3 which is not part of the candidate cell list, then it treats such cells in a default manner, i.e. for example according to standard LTE handover procedures as in current specifications. However, according to examples of embodiments of the invention, when both cells being part of the candidate cell list and cells being not part of the candidate cell list, the UE 30 is configured to give the candidate cells priority when making a decision regarding handover or the like.

In step S4, when it is decided to establish a connection to the newly detected cell identified as a member of the list for autonomous mobility procedure, the UE 30 sends, for example, an access request (or handover request) to the newly detected cell, i.e. to PeNB 20, for example, in order to initiate the connection establishment. The cell being the target of the access request, i.e. the small cell of PeNB 20, which receives the access request from the UE 30 in step S4 recognizes the ID of the requesting UE on the basis of the preparation information being sent in step S2A. Furthermore, in connection with step S5, the PeNB 20 also knows where to obtain the configuration data of the requesting UE 30 which are required for providing immediately services to the UE 30 conducting the autonomous mobility procedure. For example, the configuration data (or a part thereof) are embedded in the preparation information and thus immediately present. Alternatively or additionally, as indicated by the dashed arrow at step S5, the configuration data are fetched from the source indicated in the preparation data, such as from the MeNB 10.

Then, in step S6, the connection between the UE 30 and the cell controlled by the PeNB 20 is established wherein, by using the configuration date obtained on the basis of the preparation information the PeNB 20 is able to immediately provide services to the UE 30.

In step S7, it is assumed that the UE 30 detects a further cell, such as the cell controlled by PeNB 25. In case the UE 30 already conducts a communication with a cell, such as the cell of PeNB 20, which is allocated on the same carrier (e.g. F2), the UE 30 decides in step S7 whether or not it conducts a handover or access to the cell of PeNB 25. For example, the decision is based on a determination whether or not a connection quality to be expected with the new cell is better than that with the current cell on the same carrier. According to examples of embodiments of the invention, this decision includes for example a hysteresis margin and is based on conditions being similar to those defined for measurement report events A3 and A6 according to 3GPP specification. Such a hysteresis margin is based, for example, on an offset indicated by UE mobility reporting events such as events A3, A6, etc. (defined, for example, in 3GPP TS 36.331). For example, in the case of the A6 event, it is defined that a neighbour (cell) becomes offset better than the Scell, i.e. it is triggered if another neighbour cell becomes offset by decibels being better than the currently configured SCell. The offset is also referred to as the "hysteresis margin" for the event.

Assuming the UE 30 decides to conduct an autonomous mobility procedure with regard to the cell of PeNB 25, similar to steps S4 to S6, a connection establishment request is sent to the PeNB 25 (step S8), the PeNB 25 recognizes the UE 30 on the basis of the preparation information as an UE allowed to conduct the autonomous mobility procedure and obtains the configuration data related to the UE 30 (e.g. from the MeNB 10 in step S9) and establishes the connection to the UE 30 for immediately providing services (step S10).

According to examples of embodiments, after having obtained for the UE the access to a new candidate cell (i.e. cell of PeNB 25), the connection to former cell (i.e. cell of PeNB 20) on the same carrier is released. This is done, for example, in step S11 by sending an information to the PeNB 20 via a network internal signaling for indicating that the carrier connection is to be released. The signal is sent e.g. from the MeNB 10 via the X2 interface. Alternatively, the PeNB 25 or the UE 30 informs the PeNB 20 accordingly. As a result of the information, the PeNB 20 releases the connection to the UE 30 via the corresponding carrier.

According to examples of embodiments of the invention, when the network selects cells as candidate cells and configures (prepares) them for the potential autonomous mobility procedure conducted by specified UEs, the network includes timer information for providing information how long the respective cell is to be set as a target cell for the autonomous mobility procedure (for example, how long the preparation information have to be kept). In other words, the network can determine that the prepared cells are only valid for a certain time period, whereafter they are released. The timer information is provided to the respective cells (e.g. the PeNBs 20 and 25) in the preparation information. Furthermore, according to examples of embodiments of the invention, corresponding timer information are also provided to the UEs in connection with the list of candidate cells, so that the UE can take into account for the decision regarding a handover whether a respectively detected cell is suitable.

Furthermore, according to examples of embodiments of the invention, the network is configured to send an instruction to each of the candidate cells which explicitly releases the corresponding cell from the status of being a target cell for the autonomous mobility procedure, i.e. to remove the previous preparation for autonomous UE mobility.

By means of the above discussed release processings, it is avoided that a cell remains a target cell for an unspecified time which would require to keep the preparation information stored for this time and would hence waste resources (for example in case the UE has already left the coverage area or is switched off).

Thus, by means of the above described examples of embodiments of the invention, the mobility of a UE within a network structure comprising for example a pico cluster as depicted in FIG. 1 is improved as the mobility events becomes faster and are not dependent on the "old" pico cell RRC connection quality. Furthermore, a service interruption is minimized as the UE accessing another small cell gets the packets (and acknowledgement e.g. to a RACH operation) quickly due to the preconfigured parameters available in the small cells (i.e. the information where to fetch the configuration data, possible security parameters etc.).

According to examples of embodiments of the invention, in cases with inter-site carrier aggregation, the autonomous mobility procedure is applied in the following manner. Specifically, the autonomous mobility procedure is applied for adding SCells on a small cell layer, while always having the PCell on the macro-layer. As a result, the macro-layer PCell mobility of a UE is handled in a default manner, and due to the rather large coverage area, an acceptable low frequency of handovers is achieved (which reduces also the corresponding signaling). On the other hand, the autonomous mobility procedure is applied for the small cell frequency layer where the requirement for faster configuration/removal of SCells exists. This is basically depicted in FIG. 1 with regard to the carriers F1 and F2 where the small cells are deployed on the F2 carrier, while the macro cell uses F1. Hence, the UE 30 is always connected with the PCell at the macro cell layer. In this case, according to examples of embodiments of the invention, whenever a PCell handover is made to another macro-cell by the UE 30 (not shown in FIG. 1), the new macro-cell signals a new list of candidate cells (pico cells) that the UE is allowed to use for autonomous SCell configuration/mobility. The former valid list related to the macro cell from the UE is coming is deleted.

As indicated above, according to examples of embodiments of the invention, in the preparation of the candidate cells, the network configures the candidate cells such that the UE context information is to be requested by those candidate cells from the currently serving macro PCell of the UE when the access request in the autonomous mobility procedure (access request, handover request of UE indicated in preparation information) is received by the SCell. Thus, in this example, the macro-layer cell (MeNB 10) is able to prepare the candidate cells (small cells of PeNB 20, 25, 26) as candidates for the autonomous mobility procedure e.g. by means of X2 signaling, while the candidate cells do not need to store the (full set of) configuration data. Instead, less information are required to be stored about the UEs as in a case where the UE context data are delivered to the candidate cells already as part of the preparation information.

Figure 4:
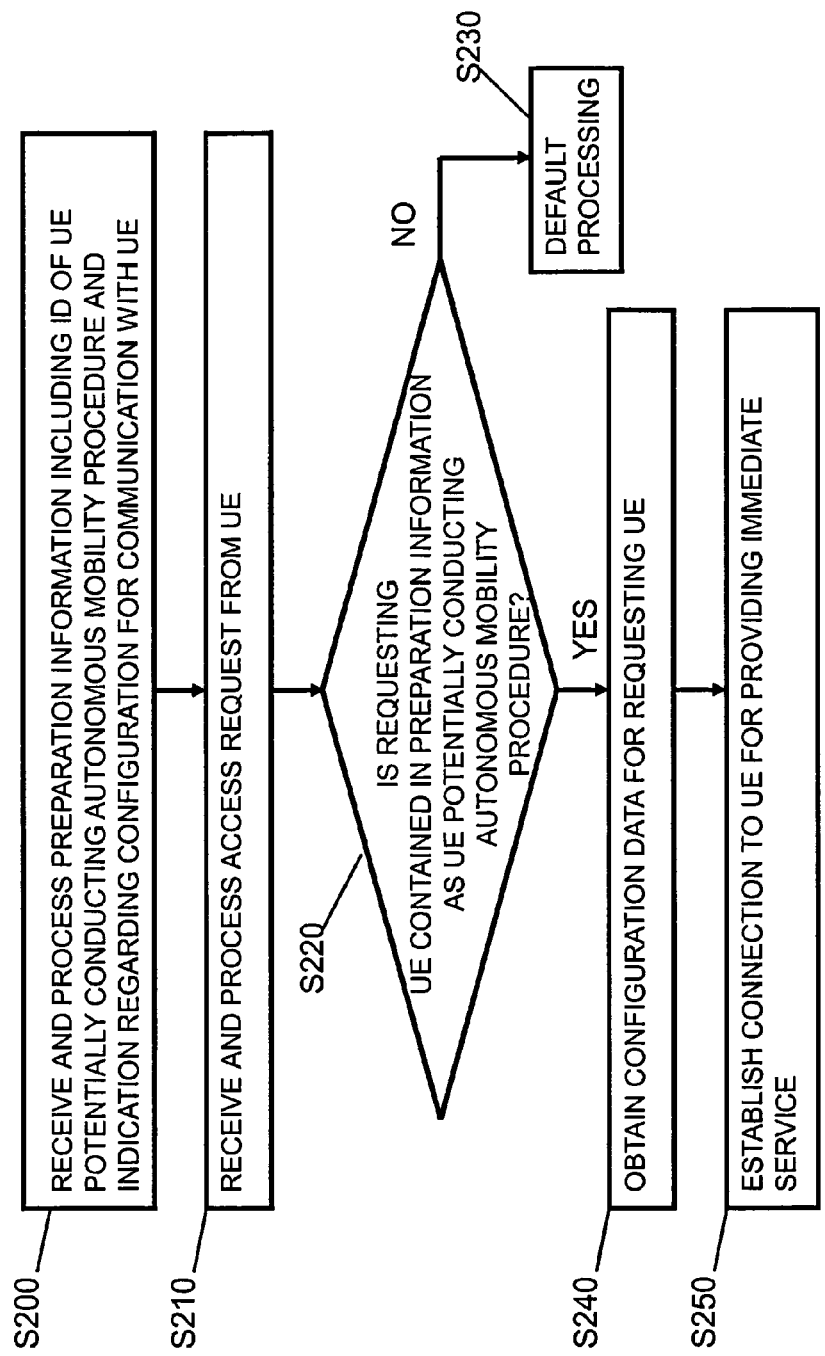
FIG. 4 shows a flowchart illustrating a processing executed in a communication network control element according to examples of embodiments of the invention.

FIG. 4 shows a flowchart illustrating a processing executed in a communication network control element like the MeNB 10 of FIG. 1 according to examples of embodiments of the invention in an autonomous mobility procedure control mechanism as described above.

In step S100, the MeNB creates a list of candidate communication cells usable as target cells for the autonomous mobility procedure (handover/access) conducted by a UE.

According to examples of embodiments of the invention, the list of candidate cells comprises at least one of an information element indicating a cell identification of each candidate communication cell (e.g. PCIs of the cells), a carrier identification element indicating a component carrier to which the autonomous mobility procedure is to be directed, and/or timer information indicating a time period in which the candidate communication cell is allowed to participate in the autonomous mobility procedure.

In step S110, sending of the list to a UE is caused. For example, according to examples of embodiments of the invention, the list is sent to the UE as a measurement configuration information.

In step S120, when the list is sent to the UE, sending of preparation information to the candidate communication cells contained in the list sent to the UE is caused. The preparation information comprise information for preparing the candidate communication cells for a potential autonomous mobility procedure conducted by the UE to which the list is sent in step S110.

According to examples of embodiments of the invention, the preparation information comprises at least one of an information element indicating an identification of the UE to which the list is sent (UE ID), an information element indicating a source for obtaining configuration data necessary for providing immediate service to the UE when the autonomous mobility procedure is executed (and/or corresponding configuration data as such), and/or timer information indicating a time period in which the candidate communication cell is allowed to participate in the autonomous mobility procedure (i.e. a time after which the cell is released from being a target cell for the autonomous mobility procedure of the specified UE). According to further examples of embodiments of the invention, the preparation information are sent to the respective cells via an interface between communication network control elements of the macro cell and the small cells, for example.

Figure 3:
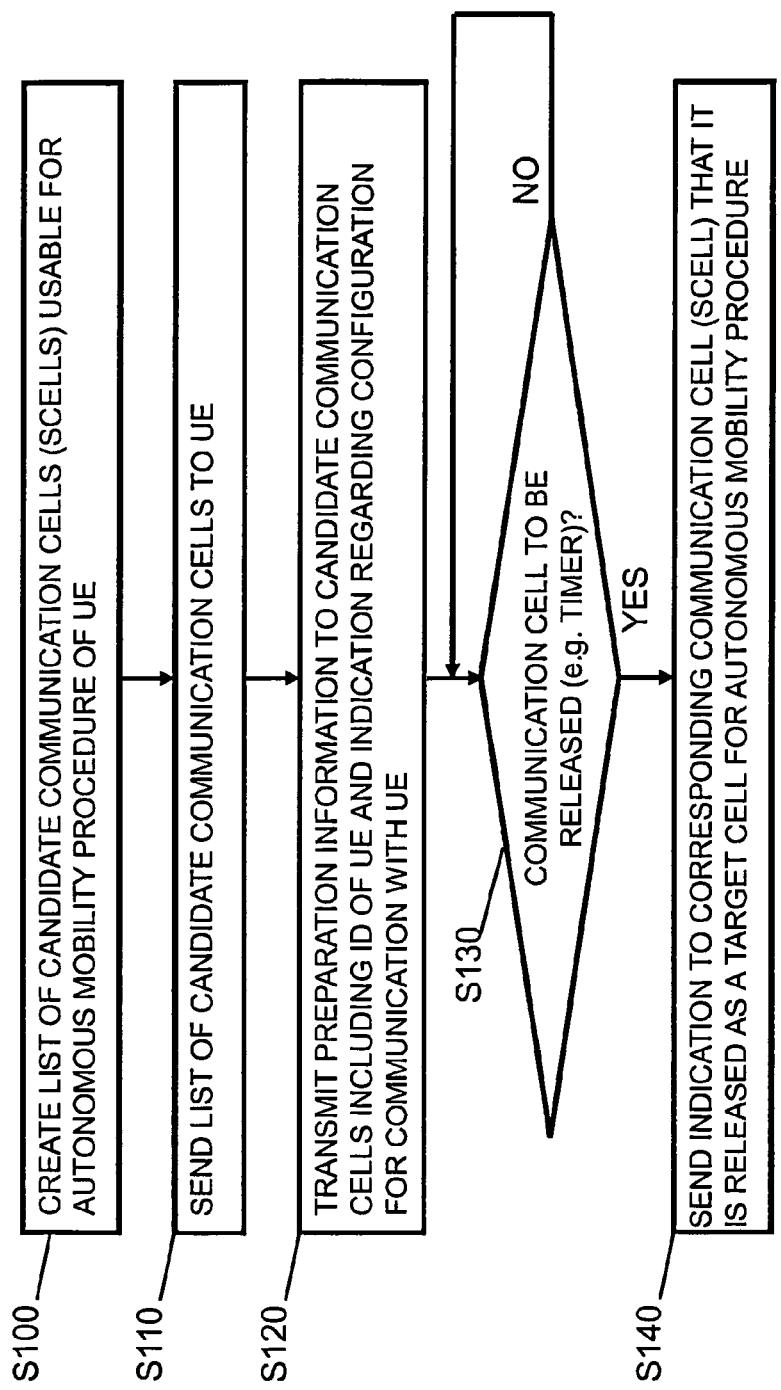
FIG. 3 shows a flowchart illustrating a processing executed in a communication network control element according to examples of embodiments of the invention.

Even though not shown in FIG. 3, the processing comprises further, according to examples of embodiments of the invention, in case the preparation information indicate the MeNB 10 as the source for the configuration data, steps for receiving from a respective candidate communication cell a request for obtaining the configuration data necessary for providing the immediate service to the UE when the autonomous mobility procedure is executed, and a step to cause transmitting of corresponding configuration data related to the UE to the requesting candidate communication cell.

Furthermore, even though not shown in FIG. 3, the processing comprises further, according to examples of embodiments of the invention, a detection that a switch-over of the UE from a first of the candidate communication cells to a second of the candidate communication cells on the same carrier is completed, e.g. by a corresponding indication from the UE or the second candidate communication cell. If such a detection is done, the MeNB 10 instructs the first of the candidate communication cells to release the connection to the UE via the carrier.

In step S130 of FIG. 3, it is determined whether a candidate cell is to be released. This detection is based, for example, on the detection that the timer set for the preparation information is elapsed, or on an indication of an operator or the like. If the determination is positive (YES in step S130), the corresponding cell is informed that it is released as a target cell for the autonomous mobility procedure conducted by the UE. Otherwise (NO in step S130), the processing returns.

FIG. 4 shows a flowchart illustrating a processing executed in a communication network control element like the PeNB 20 of FIG. 1 according to examples of embodiments of the invention in an autonomous mobility procedure control mechanism as described above.

In step S200, preparation information is received from the network, e.g. from the MeNB 10. As described above, the preparation information comprising information for preparing the receiving cell (i.e. cell of PeNB 20) as a target cell for a potential autonomous mobility procedure conducted by a UE. The preparation information corresponds to that sent in step S120 of FIG. 3, for example, i.e. at least one of a UE ID, configuration data, a source for the configuration data, and timer information.

In step S210, a request from a UE to establish a connection is received and processed.

In step S220, it is determined whether the preparation information is related to the requesting UE, i.e. whether the UE is indicated in the preparation information as potentially conducting the autonomous mobility procedure.

If the UE is not identified by the preparation information, a default processing according to current standards is conducted for deciding on the access request (step S230).

Otherwise, in case it is determined in step S220 that the requesting UE is indicated in the preparation information, in step S240, the configuration data are obtained according to the indication in the preparation information (i.e. directly from the preparation information or retrieved from the MeNB 10, for example).

Then, in step S250, when the configuration data are retrieved, a connection to the requesting UE is established for providing immediate service.

Even though not shown in FIG. 4, the processing comprises further, according to examples of embodiments of the invention, steps for receiving and processing an instruction to release the connection to the UE via a carrier, e.g. when a switch-over of the UE to another communication cell on the same carrier is completed.

Furthermore, even though not shown in FIG. 4, the processing comprises further, according to examples of embodiments of the invention, steps for receiving and processing an information indicating a release as a target cell for the autonomous mobility procedure conducted by the communication element.

Figure 5:
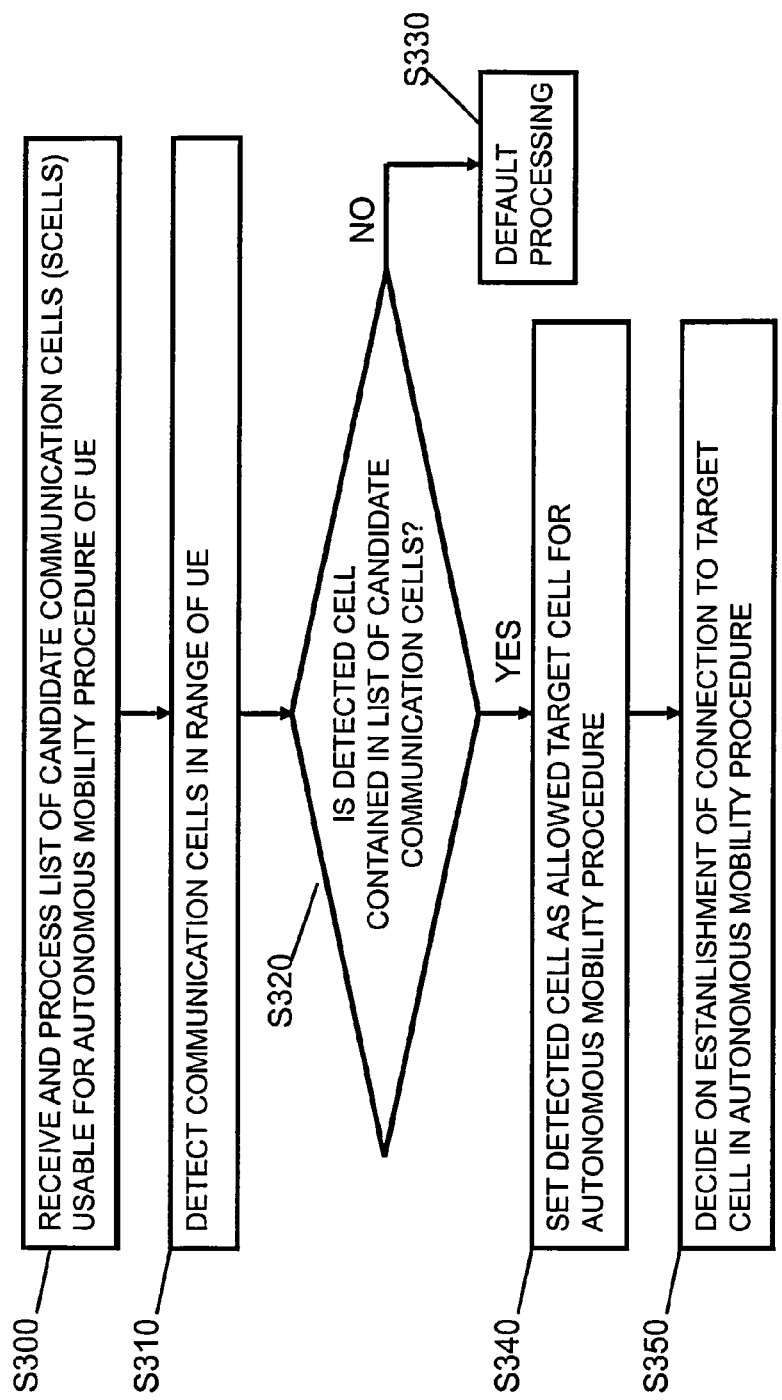
FIG. 5 shows a flowchart illustrating a processing executed in a communication element according to examples of embodiments of the invention.

FIG. 5 shows a flowchart illustrating a processing executed in a communication element like the UE 30 of FIG. 1 according to examples of embodiments of the invention in an autonomous mobility procedure control mechanism as described above.

In step S300, the UE receives and processes a list of candidate communication cells usable as target cells for an autonomous mobility procedure conducted by the UE. The list is sent, for example, from the MeNB 10 and contains information as described in connection with step S100 of FIG. 3, i.e. at least one of an information element indicating a cell identification of each candidate communication cell (PCI), a carrier identification element indicating a component carrier to which the autonomous mobility procedure is to be directed, and/or a timer information indicating a time period in which the candidate communication cell is allowed to participate in the autonomous mobility procedure. According to examples of embodiments of the invention, the list is received in the form of measurement configuration information.

In step S310, the UE detects communication cells suitable for establishing a communication connection. The detection is done, for example, in commonly known ways.

In step S320, on the basis of the list received in step S300, the UE determines whether the detected communication cell is comprised in the list of candidate communication cells for the autonomous mobility procedure.

If the UE does not identify the detected cell in the list (NO in step S320), a default processing according to current standards is conducted for further mobility procedure (e.g. measurement reports etc.) (step S330).

Otherwise, in case it is determined in step S320 that the detected cell is a candidate cell (YES in step S320), in step S340, an allowance to conduct the autonomous mobility procedure to request immediate access to the detected cell as a target cell is provided.

In step S350, the UE conducts a decision procedure for deciding whether the autonomous mobility procedure is to be conducted to the target cell (i.e. the cell detected in step S310). The decision is based, for example, on a connection quality evaluation related to an existing connection to another cell (even to another candidate cell) and a connection to be established to the target cell. If the UE decides to establish a connection to the detected cell, according to examples of embodiments of the invention, it requests in the autonomous mobility procedure a connection establishment via a random access channel to get immediate access to the target cell.

Figure 6:
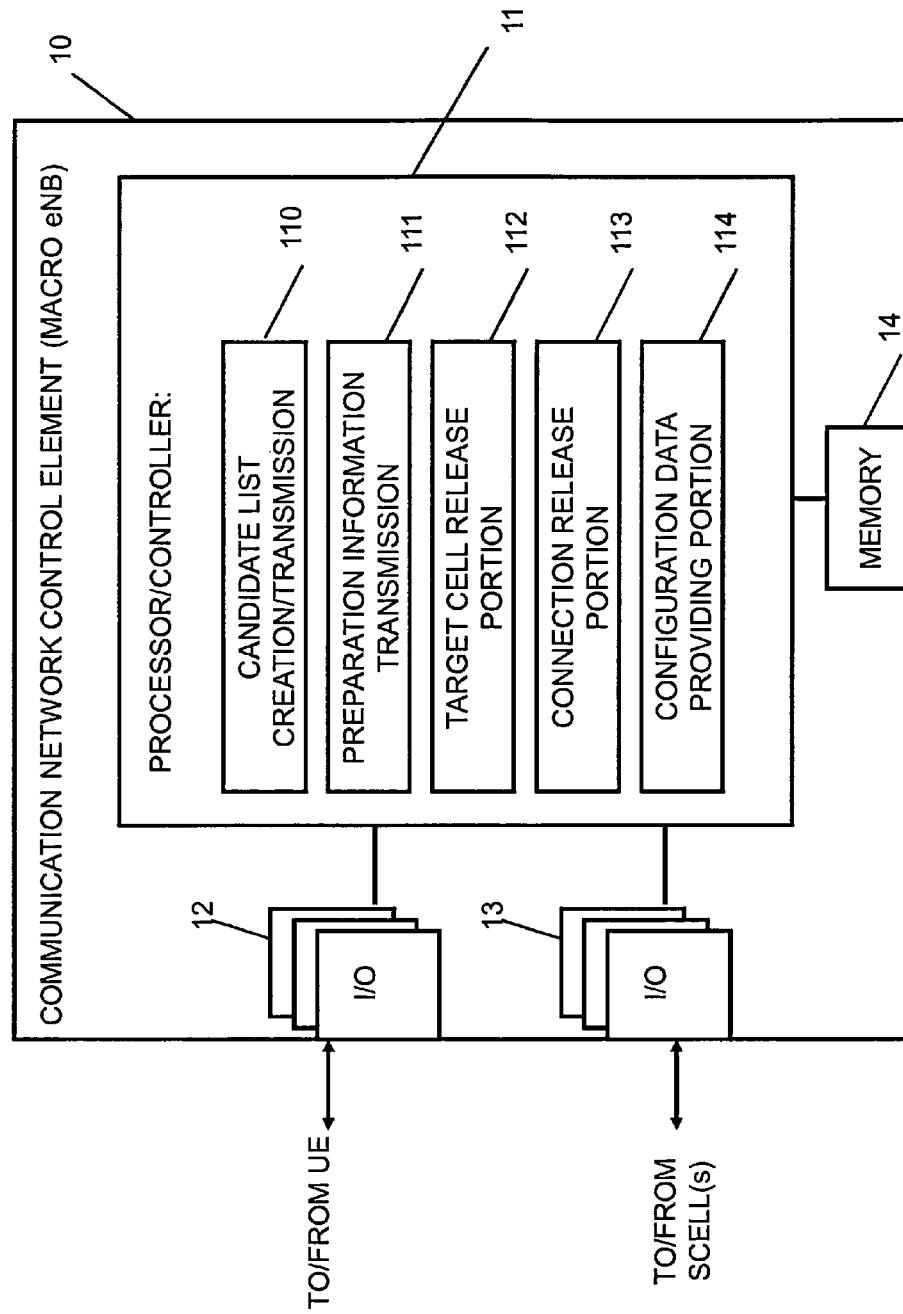
FIG. 6 shows a block circuit diagram of a communication network control element including processing portions conducting functions according to examples of embodiments of the invention.

In FIG. 6, a block circuit diagram illustrating a configuration of a communication network control element, such as of MeNB 10, is shown, which is configured to implement the autonomous mobility procedure control mechanism as described in connection with the examples of embodiments of the invention. It is to be noted that the communication network control element or MeNB 10 shown in FIG. 6 may comprise several further elements or functions besides those described herein below, which are omitted herein for the sake of simplicity as they are not essential for understanding the invention. Furthermore, even though reference is made to an eNB, the communication network control element may be also another device having a similar function, such as a chipset, a chip, a module etc., which can also be part of a control element or eNB or attached as a separate element to an eNB, or the like.

The communication network control element or MeNB 10 may comprise a processing function or processor 11, such as a CPU or the like, which executes instructions given by programs or the like related to the flow control mechanism. The processor 11 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference signs 12 and 13 denote transceiver or input/output (I/O) units (interfaces) connected to the processor 11. The I/O units 12 may be used for communicating with one or more communication elements like UEs. The I/O units 12 may be used for communicating with one or more communication network control elements like PeNBs 20, 25 and 26. The I/O units 12 and 13 may be a combined unit comprising communication equipment towards several network elements, or may comprise a distributed structure with a plurality of different interfaces for different network elements. Reference sign 14 denotes a memory usable, for example, for storing data and programs to be executed by the processor 11 and/or as a working storage of the processor 11.

The processor 11 is configured to execute processing related to the above described autonomous mobility procedure control mechanism. In particular, the processor 11 comprises a sub-portion 110 as a processing portion which is usable for creating and transmitting a list of candidate communication cells. The portion 110 may be configured to perform processing according to steps S100 and S110 of FIG. 3, for example. Furthermore, the processor 11 comprises a sub-portion 111 usable as a portion for transmitting preparation information to the candidate communication cells. The portion 111 may be configured to perform processing according to step S120 of FIG. 3, for example. Furthermore, the processor 11 comprises a sub-portion 112 usable as a portion for releasing a target cell. The portion 112 may be configured to perform processing according to steps S130 and S140 of FIG. 3, for example. In addition, the processor 11 comprises a sub-portion 113 as a processing portion which is usable for instructing to release a connection at a candidate cell. Furthermore, the processor 11 comprises a sub-portion 114 usable as a portion for providing configuration data to a requesting cell.

Figure 7:
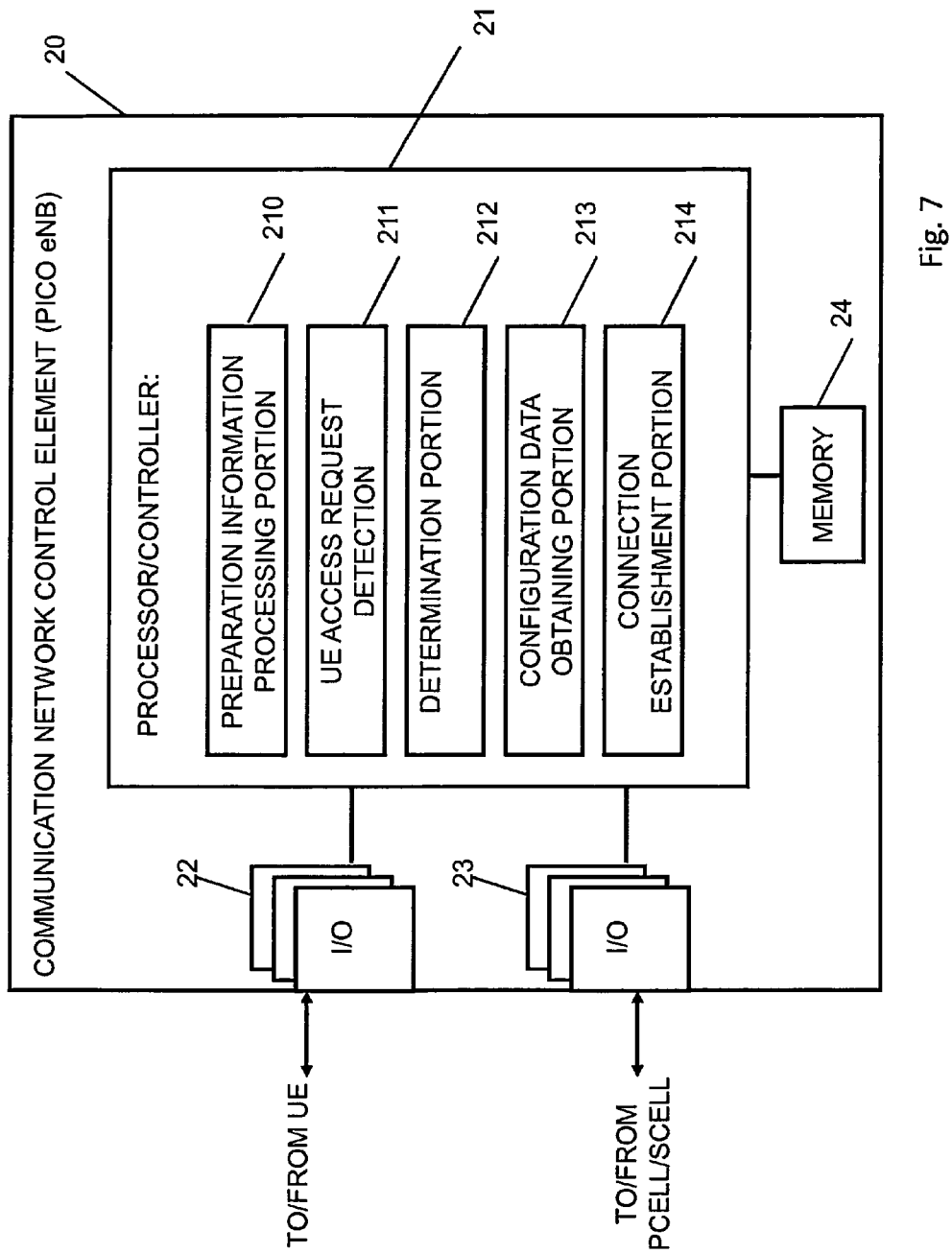
FIG. 7 shows a block circuit diagram of a communication network control element including processing portions conducting functions according to examples of embodiments of the invention.

In FIG. 7, a block circuit diagram illustrating a configuration of a communication network control element, such as of PeNB 20, is shown, which is configured to implement the autonomous mobility procedure control mechanism as described in connection with the examples of embodiments of the invention. It is to be noted that the communication network control element or PeNB 20 shown in FIG. 7 may comprise several further elements or functions besides those described herein below, which are omitted herein for the sake of simplicity as they are not essential for understanding the invention. Furthermore, even though reference is made to an eNB, the communication network control element may be also another device having a similar function, such as a chipset, a chip, a module etc., which can also be part of a control element or eNB or attached as a separate element to an eNB, or the like.

The communication network control element or PeNB 20 may comprise a processing function or processor 21, such as a CPU or the like, which executes instructions given by programs or the like related to the flow control mechanism. The processor 21 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference signs 22 and 23 denote transceiver or input/output (I/O) units (interfaces) connected to the processor 21. The I/O units 22 may be used for communicating with one or more communication elements like UEs. The I/O units 22 may be used for communicating with one or more communication network control elements like the MeNB 10 or PeNBs 25 and 26. The I/O units 22 and 23 may be a combined unit comprising communication equipment towards several network elements, or may comprise a distributed structure with a plurality of different interfaces for different network elements. Reference sign 24 denotes a memory usable, for example, for storing data and programs to be executed by the processor 21 and/or as a working storage of the processor 21.

The processor 21 is configured to execute processing related to the above described autonomous mobility procedure control mechanism. In particular, the processor 21 comprises a sub-portion 210 as a processing portion which is usable for receiving and processing the preparation information from the network. The portion 210 may be configured to perform processing according to step S200 of FIG. 4, for example. Furthermore, the processor 21 comprises a sub-portion 211 usable as a portion for detecting an access request from a UE. The portion 211 may be configured to perform processing according to step S210 of FIG. 4, for example. Furthermore, the processor 21 comprises a sub-portion 212 usable as a portion for determination regarding the UE. The portion 212 may be configured to perform processing according to step S220 of FIG. 4, for example. In addition, the processor 21 comprises a sub-portion 213 as a processing portion which is usable for obtaining the configuration data related to the UE. The portion 213 may be configured to perform processing according to step S240 of FIG. 4, for example. Furthermore, the processor 11 comprises a sub-portion 214 usable as a portion for establishing a connection to the UE. The portion 214 may be configured to perform processing according to step S250 of FIG. 4, for example.

Figure 8:
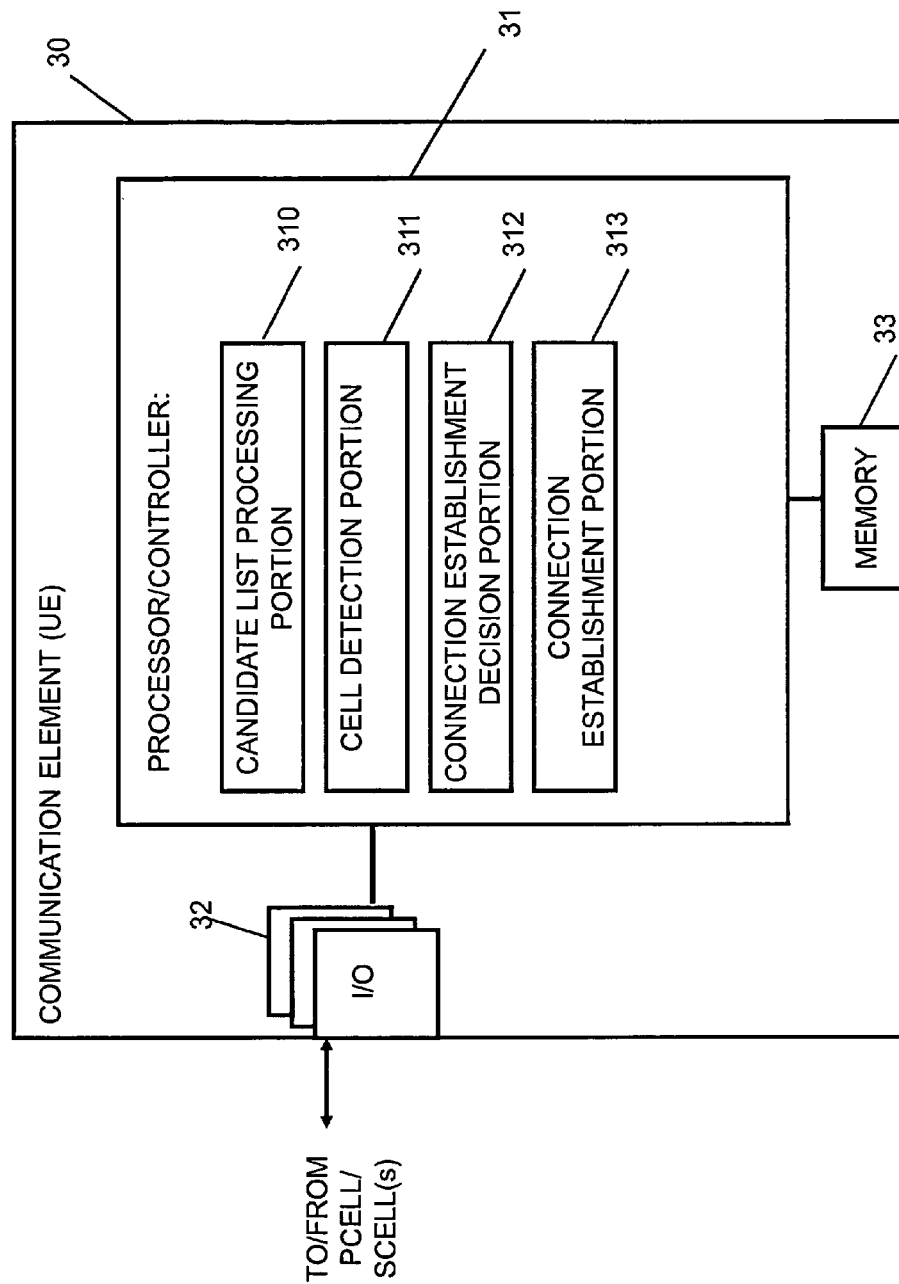
FIG. 8 shows a block circuit diagram of a communication network control element including processing portions conducting functions according to examples of embodiments of the invention.

In FIG. 8, a block circuit diagram illustrating a configuration of a communication element, such as of UE 30, is shown, which is configured to implement the autonomous mobility procedure control mechanism as described in connection with the examples of embodiments of the invention. It is to be noted that the communication element or UE 30 shown in FIG. 8 may comprise several further elements or functions besides those described herein below, which are omitted herein for the sake of simplicity as they are not essential for understanding the invention. Furthermore, even though reference is made to a UE (or terminal device), the communication element may be also another device having a similar function, such as a chipset, a chip, a module etc., which can also be part of a UE or attached as a separate element to a UE, or the like.

The communication element or UE 30 may comprise a processing function or processor 31, such as a CPU or the like, which executes instructions given by programs or the like related to the flow control mechanism. The processor 31 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 32 denotes transceiver or input/output (I/O) units (interfaces) connected to the processor 31. The I/O units 32 may be used for communicating with one or more communication network control elements like the MeNB 10 or PeNBs 20, 25 and 26. The I/O units 32 may be a combined unit comprising communication equipment towards several network elements, or may comprise a distributed structure with a plurality of different interfaces for different network elements. Reference sign 33 denotes a memory usable, for example, for storing data and programs to be executed by the processor 31 and/or as a working storage of the processor 31.

The processor 31 is configured to execute processing related to the above described autonomous mobility procedure control mechanism. In particular, the processor 31 comprises a sub-portion 310 as a processing portion which is usable for receiving and processing the list of candidate communication cells. The portion 310 may be configured to perform processing according to step S300 of FIG. 5, for example, and if a cell is detected, according to steps S320 and S340 of FIG. 5, for example. Furthermore, the processor 31 comprises a sub-portion 311 usable as a portion for detecting a communication cell. The portion 311 may be configured to perform processing according to step S310 of FIG. 5, for example. Furthermore, the processor 31 comprises a sub-portion 312 usable as a portion for deciding on an establishment of a connection. The portion 212 may be configured to perform processing according to step S350 of FIG. 4, for example. In addition, the processor 31 comprises a sub-portion 313 as a processing portion which is usable for conducting a connection establishment with a detected cell.

According to further examples of embodiments of the invention, there is provided an apparatus comprising candidate list creation means for creating a list of candidate communication cells usable as target cells for an autonomous mobility procedure conducted by a communication element, list sending means for causing sending the list to a communication element, and preparation information means for causing transmitting, when the list is sent to the communication element, preparation information to the candidate communication cells contained in the list sent to the communication element, the preparation information comprising information for preparing the candidate communication cells for a potential autonomous mobility procedure conducted by the communication element.

Furthermore, according to further examples of embodiments of the invention, there is provided an apparatus comprising preparation information processing means for receiving and processing preparation information, the preparation information comprising information for preparing a cell as a target cell for a potential autonomous mobility procedure conducted by a communication element, communication access request processing means for receiving and processing a request from a communication element to establish a connection, determination means for determining whether the preparation information is related to the requesting communication element, configuration data obtaining means for obtaining, in case it is determined that the preparation information is related to the requesting communication element, on the basis of the preparation information, configuration data necessary for providing immediate service to the communication element when the autonomous mobility procedure is executed, and connection establishing means for establishing a connection to the requesting communication element by using the configuration data obtained.

Moreover, according to further examples of embodiments of the invention, there is provided an apparatus comprising candidate list processing means for receiving and processing a list of candidate communication cells usable as target cells for an autonomous mobility procedure conducted by a communication element, and cell detection means for detecting communication cells for establishing a communication connection, wherein the candidate list processing means is further for determining whether a communication cell detected is comprised in the list of candidate communication cells, and in case the detected communication cell is comprised in the list, for allowing to conduct the autonomous mobility procedure to request immediate access to the detected cell as a target cell.

For the purpose of the present invention as described herein above, it should be noted that

- an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, Bluetooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto,
- usable communication networks, stations and transmission nodes may be or comprise any device, apparatus, unit or means by which a station, entity or other user equipment may connect to and/or utilize services offered by the access network; such services include, among others, data and/or (audio-) visual communication, data download etc.;
- a user equipment or communication network element (station) may be any device, apparatus, unit or means by which a system user or subscriber may experience services from an access network, such as a mobile phone or smart phone, a personal digital assistant PDA, or computer, or a device having a corresponding functionality, such as a modem chipset, a chip, a module etc., which can also be part of a UE or attached as a separate element to a UE, or the like;
- method steps likely to be implemented as software code portions and being run using a processor at a network element or terminal (as examples of devices, apparatuses and/or modules thereof, or as examples of entities including apparatuses and/or modules for it), are software code independent and can be specified using any known or future developed programming language as long as the functionality defined by the method steps is preserved;
- generally, any method step is suitable to be implemented as software or by hardware without changing the idea of the invention in terms of the functionality implemented;
- method steps and/or devices, apparatuses, units or means likely to be implemented as hardware components at a terminal or network element, or any module(s) thereof, are hardware independent and can be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;
- devices, apparatuses, units or means can be implemented as individual devices, apparatuses, units or means, but this does not exclude that they are implemented in a distributed fashion throughout the system, as long as the functionality of the device, apparatus, unit or means is preserved; for example, for executing operations and functions according to examples of embodiments of the invention, one or more processors may be used or shared in the processing, or one or more processing sections or processing portions may be used and shared in the processing, wherein one physical processor or more than one physical processor may be used for implementing one or more processing portions dedicated to specific processing as described,
- an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
- a device may be regarded as an apparatus or as an assembly of more than one apparatus, whether functionally in cooperation with each other or functionally independently of each other but in a same device housing, for example.

As described above, there is provided a mechanism for controlling an autonomous mobility procedure of a user equipment. A list of candidate communication cells usable as target cells for the autonomous mobility procedure conducted by the UE is transmitted by the network to the UE. Furthermore, when the list is sent to the communication element, preparation information is sent to the candidate communication cells contained in the list sent to the user equipment for preparing the candidate communication cells for a potential autonomous mobility procedure conducted by the user equipment. When a cell is detected, the user equipment uses the list to determine whether the detected cell is a candidate cell for the autonomous mobility procedure. When the cell receives an access request, it uses the preparation information for determining that the requesting UE is conducting an autonomous mobility procedure, and obtains configuration date for immediately providing service to the user equipment.

Although the present invention has been described herein before with reference to particular embodiments thereof, the present invention is not limited thereto and various modifications can be made thereto.

The invention claimed is:

1. An apparatus comprising:
at least one processor, and
at least one memory storing instructions executed by the at least one processor, wherein the at least one memory and the instructions are configured to, with the at least one processor, cause the apparatus at least to:
create a list of candidate communication cells usable as target cells for a potential autonomous mobility procedure in a communication network by a communication element;
send the list to a communication element; and
transmit, when the list is sent to the communication element, preparation information to the candidate communication cells contained in the list sent to the communication element, the preparation information comprising information for preparing the candidate communication cells for the potential autonomous mobility procedure by the communication element, wherein the preparation information comprises timer information indicating a time period in which the candidate communication cells are allowed to participate in the autonomous mobility procedure.

2. The apparatus according to claim 1, wherein the list of candidate communication cells comprises at least one of:
an information element indicating a cell identification of each candidate communication cell,
a carrier identification element indicating a component carrier to which the autonomous mobility procedure is to be directed, and
timer information indicating a time period in which the candidate communication cell is allowed to participate in the autonomous mobility procedure.

3. The apparatus according to claim 1, wherein the at least one memory and the instructions are configured to, with the at least one processor, cause the apparatus to send the list to the communication element as a measurement configuration information.

4. The apparatus according to claim 1, wherein the preparation information comprises:
configuration data necessary for providing immediate service to the communication element when the autonomous mobility procedure is executed.

5. The apparatus according to claim 1, wherein the at least one memory and the instructions are configured to, with the at least one processor, cause the apparatus to transmit the preparation information via an interface between communication network control elements.

6. The apparatus according to claim 4, wherein the at least one memory and the instructions are configured to, with the at least one processor, cause the apparatus at least to:
receive from a candidate communication cell a request for obtaining the configuration data necessary for providing the immediate service to the communication element when the autonomous mobility procedure is executed; and
transmit corresponding configuration data related to the communication element to the requesting candidate communication cell.

7. The apparatus according to claim 1, wherein the at least one memory and the instructions are configured to, with the at least one processor, cause the apparatus at least to:
detect a switch-over of the communication element from a first of the candidate communication cells to a second of the candidate communication cells on the same carrier; and
instruct the first of the candidate communication cells to release the connection to the communication element via the carrier.

8. The apparatus according to claim 1, wherein the at least one memory and the instructions are configured to, with the at least one processor, cause the apparatus at least to:
inform any of the candidate communication cells that it is released as a target cell for the autonomous mobility procedure by the communication element.

9. The apparatus according to claim 1, wherein the apparatus is comprised in a communication network control element controlling a primary serving cell with which the communication element communicates, wherein the communication element is a terminal device or user equipment, and wherein the candidate communication cells are secondary cells located in an area of the primary serving cell.

10. The apparatus according to claim 9, wherein the primary serving cell is configured to communicate with the communication element via at least one first carrier, and each of the secondary cells is configured to communicate with the communication element via at least one second carrier, wherein a carrier aggregation of the at least one first carrier and the at least one second carrier is used for a communication of the communication element.

11. A method comprising
creating a list of candidate communication cells usable as target cells for a potential autonomous mobility procedure by a communication element;
sending the list to a communication element; and
transmitting, when the list is sent to the communication element, preparation information to the candidate communication cells contained in the list sent to the communication element, the preparation information comprising information for preparing the candidate communication cells for the potential autonomous mobility procedure by the communication element, and timer information indicating a time period in which the candidate communication cells are allowed to participate in the autonomous mobility procedure.

12. The method according to claim 11, wherein the list of candidate cells comprises at least one of:
an information element indicating a cell identification of each candidate communication cell, and
a carrier identification element indicating a component carrier to which the autonomous mobility procedure is to be directed.

13. The method according to claim 11, further comprising sending of the list to the communication element as a measurement configuration information.

14. The method according to claim 11, wherein the preparation information comprises:
configuration data necessary for providing immediate service to the communication element when the autonomous mobility procedure is executed, and
timer information indicating a time period in which the candidate communication cell is allowed to participate in the autonomous mobility procedure.

15. The method according to claim 11, further comprising transmitting the preparation information via an interface between communication network control elements.

16. The method according to claim 14, further comprising
receiving from a candidate communication cell a request for obtaining the configuration data necessary for providing the immediate service to the communication element when the autonomous mobility procedure is executed; and
transmitting corresponding configuration data related to the communication element to the requesting candidate communication cell.

17. The method according to claim 11, further comprising
detecting a switch-over of the communication element from a first of the candidate communication cells to a second of the candidate communication cells on the same carrier; and
instructing the first of the candidate communication cells to release the connection to the communication element via the carrier.

18. The method according to claim 11, further comprising informing any of the candidate communication cells that it is released as a target cell for the autonomous mobility procedure by the communication element.

19. The method according to claim 11, wherein the method is implemented in a communication network control element controlling a primary serving cell with which the communication element communicates, wherein the communication element is a terminal device or user equipment, and wherein the candidate communication cells are secondary cells located in an area of the primary serving cell.

20. The method according to claim 19, wherein the primary serving cell is configured to communicate with the communication element via at least one first carrier, and each of the secondary cells is configured to communicate with the communication element via at least one second carrier, wherein a carrier aggregation of the at least one first carrier and the at least one second carrier is used for a communication of the communication element.

* * * * *